(12) United States Patent
Niroomand

(10) Patent No.: US 10,428,557 B2
(45) Date of Patent: Oct. 1, 2019

(54) WIRELESS LOCK SYSTEM

(71) Applicant: Ehsan Niroomand, Aliso Viejo, CA (US)

(72) Inventor: Ehsan Niroomand, Aliso Viejo, CA (US)

( * ) Notice: Subject to any disclaimer, the term of this patent is extended or adjusted under 35 U.S.C. 154(b) by 0 days.

(21) Appl. No.: 15/706,179

(22) Filed: Sep. 15, 2017

(65) Prior Publication Data

US 2018/0075679 A1    Mar. 15, 2018

Related U.S. Application Data

(60) Provisional application No. 62/395,258, filed on Sep. 15, 2016.

(51) Int. Cl.
*E05B 67/22*   (2006.01)
*E05B 47/06*   (2006.01)
(Continued)

(52) U.S. Cl.
CPC ............ *E05B 67/22* (2013.01); *E05B 47/026* (2013.01); *E05B 47/0603* (2013.01);
(Continued)

(58) Field of Classification Search
CPC ............ E05B 47/0002; E05B 47/0003; E05B 47/0004; E05B 47/02; E05B 47/026; E05B 47/0603; E05B 2047/0007; E05B 2047/0008; E05B 2047/0014; E05B 2047/0015; E05B 2047/0016; E05B 2047/0036; E05B 2047/0094; E05B 2047/0095; E05B 67/00; E05B 67/22; E05B 67/36
See application file for complete search history.

(56) References Cited

U.S. PATENT DOCUMENTS 6,408,661 B1 * 6/2002 Chen ....................... E05B 67/36
                                                         70/226
7,236,085 B1 * 6/2007 Aronson ............... E05B 45/005
                                                         109/45

(Continued)

FOREIGN PATENT DOCUMENTS

CN    204002132 U    12/2014
CN    204139773 U     2/2015
(Continued)

OTHER PUBLICATIONS

Jeong, HDJ et al., Utilizing a Bluetooth Remote Lock System for a Smartphone; Pervasive and Mobile Computing; 24: 150-165, Publication Date: 2015.

(Continued)

*Primary Examiner* — Christopher J Boswell
(74) *Attorney, Agent, or Firm* — Cionca IP Law P.C.; Marin Cionca

(57) ABSTRACT

A lock that includes a motor driven pin, a first motor connected to the motor driven pin, and a body housing the first motor and the motor driven pin. The motor driven pin is moveable from an open position where it is inside the body to a closed position where it is at least partially outside the body. The body includes a hook member. When the motor driven pin is in the closed position, the hook member and the motor driven pin create a closed loop.

20 Claims, 13 Drawing Sheets

(51) Int. Cl.
*G07C 9/00* (2006.01)
*E05B 47/02* (2006.01)
*E05B 67/36* (2006.01)
*E05B 47/00* (2006.01)
*G05B 19/042* (2006.01)

(52) U.S. Cl.
CPC .......... *E05B 67/36* (2013.01); *G07C 9/00039* (2013.01); *G07C 9/00119* (2013.01); *G07C 9/00174* (2013.01); *G07C 9/00182* (2013.01); *G07C 9/00944* (2013.01); *E05B 47/0012* (2013.01); *E05B 2047/0007* (2013.01); *E05B 2047/0014* (2013.01); *E05B 2047/0023* (2013.01); *E05B 2047/0095* (2013.01); *G05B 19/042* (2013.01); *G05B 2219/25186* (2013.01); *G07C 9/00142* (2013.01); *G07C 2009/0019* (2013.01)

(56) References Cited

U.S. PATENT DOCUMENTS

| | | | | |
|---|---|---|---|---|
| 7,382,250 | B2* | 6/2008 | Marcelle | E05B 47/0012 |
| | | | | 340/5.22 |
| 8,225,629 | B2* | 7/2012 | Zuraski | E05B 67/003 |
| | | | | 292/DIG. 37 |
| 8,875,550 | B1* | 11/2014 | Spunt | G07C 9/00896 |
| | | | | 70/233 |
| 9,109,379 | B1* | 8/2015 | Ranchod | E05B 67/00 |
| 9,679,429 | B2* | 6/2017 | Duncan | G07C 9/00309 |
| 9,830,759 | B2* | 11/2017 | Hilton | G07C 9/00182 |
| 2003/0102957 | A1 | 6/2003 | Crisp | |
| 2006/0283216 | A1* | 12/2006 | Marcelle | G07C 9/00182 |
| | | | | 70/38 A |
| 2012/0011902 | A1 | 1/2012 | Meekma | |
| 2013/0086956 | A1* | 4/2013 | Nave | E05B 67/00 |
| | | | | 70/20 |
| 2013/0335193 | A1 | 12/2013 | Hanson et al. | |
| 2014/0150502 | A1 | 6/2014 | Duncan | |
| 2014/0157838 | A1 | 6/2014 | Nave | |
| 2015/0292244 | A1* | 10/2015 | Beatty | E05B 47/0012 |
| | | | | 70/20 |
| 2016/0042582 | A1 | 2/2016 | Hyde et al. | |
| 2016/0049032 | A1 | 2/2016 | Ranchod | |
| 2016/0186470 | A1 | 6/2016 | Chiaravalloti | |
| 2016/0333607 | A1* | 11/2016 | Cagan | E05B 73/0011 |
| 2017/0030109 | A1* | 2/2017 | Duncan | G07C 9/00309 |
| 2019/0180543 | A1* | 6/2019 | Tewkesbury | E05B 47/0001 |

FOREIGN PATENT DOCUMENTS

| | | |
|---|---|---|
| CN | 204229495 U | 3/2015 |
| CN | 204920504 U | 12/2015 |
| KR | 200478030 Y1 | 8/2015 |

OTHER PUBLICATIONS

4400d Indoor Bluetooth Smart Padlock, 2-inch Wide Body, 7/8-inch Shackle Height, 9/32-inch Diameter Shackle Source: https://www.amazon.com/4400D-Bluetooth-Padlock-Shackle-Diameter/dp/B01A65T96E, Date Accessed: Jul. 22, 2016.

Mul-t-lock #13 E-series Padlock—Sliding Bolt Source: http://www.affordablelocksmiths.com/mul-t-lock-13-e-series-padlock-sliding-bolt/ Date Accessed: Jun. 22, 2016.

* cited by examiner

WIRELESS LOCK SYSTEM

CROSS-REFERENCE TO RELATED APPLICATIONS

This application claims the benefit of U.S. provisional application Ser. No. 62/395,258 filed Sep. 15, 2016, the disclosure of which is hereby incorporated in its entirety by reference herein.

TECHNICAL FIELD

The present disclosure relates to locking systems, and in particular to padlocks that can be remotely controlled from mobile devices, such as mobile phones and computers.

BACKGROUND

Traditional padlocks include a shackle that is moveable from a locked to an unlocked position. The shackle is connected to a locking mechanism stored inside a padlock body. The locking mechanism is operated by a key that can cause the shackle to unlock. The shackle can be placed in a locking position then manually pressed to lock. Some conventional padlocks have locking mechanisms that are operated using a dial that requires a code consisting of a combination of numbers. Some of them require a specific dial movement to unlock. Opening these padlocks can be a challenge especially when opening these padlocks while carrying heavy or bulky objects. Additionally, keys can be lost, or passwords can be forgotten. Sometimes these padlocks are not properly locked, and thus, the objects being secured by the padlocks are vulnerable to being stolen. The above problems are addressed by this disclosure as summarized below.

SUMMARY

The present disclosure relates to a wireless lock system that includes: a motor driven pin; a motor connected to the motor driven pin; a controller in communication with the motor, a wireless-communication network, which is in communication with the controller and allows a mobile device to communicate with the controller to operate the motor and the motor driven pin; a lock housing containing the motor and the motor driven pin, which is moveable from an open position where it is inside the housing to a closed position where it is at least partially outside the housing; and a hook member connected to the lock housing, wherein when the motor driven pin is in the closed position, the hook member and the motor driven pin create a closed loop.

The present disclosure further relates to a lock that includes a motor driven pin, a first motor connected to the motor driven pin, and a body housing the first motor and the motor driven pin. The motor driven pin is moveable from an open position where it is inside the body to a closed position where it is at least partially outside the body. The body includes a hook member. When the motor driven pin is in the closed position, the hook member and the motor driven pin create a secured loop. In certain embodiments, the lock also includes a controller positioned inside the body and in communication with the first motor, a Bluetooth controller in communication with the controller, and a Bluetooth antenna in communication with the Bluetooth controller. The lock can communicate with a mobile device via its Bluetooth antenna, Bluetooth controller, and controller allowing the mobile device to control the first motor and movement of the motor driven pin. In yet other embodiments, the lock further includes a second motor driver adapted to move perpendicular to movement direction of the motor driven pin and a second motor connected to the second motor driver. The second motor driver and the second motor are contained in the body of the lock.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
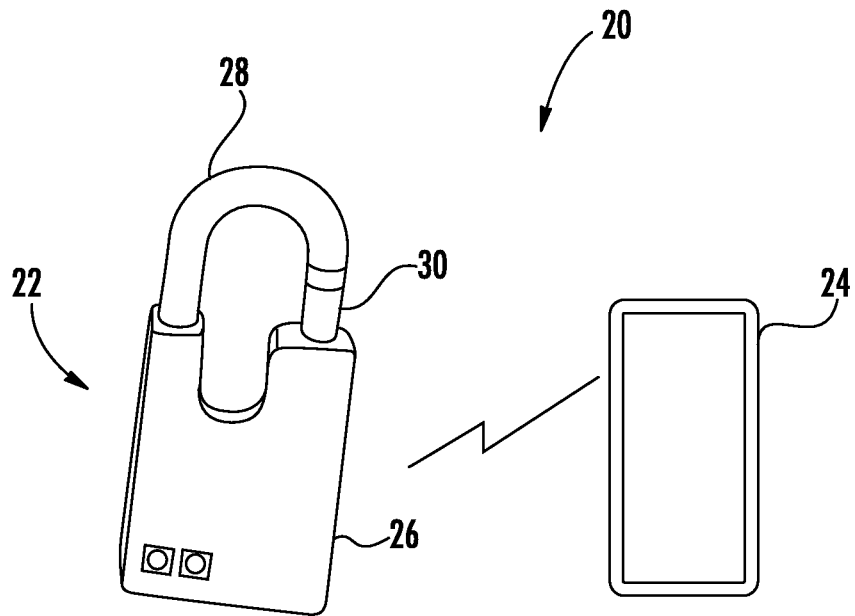
FIG. 1A shows an embodiment of a wireless lock system that is controllable by a mobile device.

The present disclosure relates to a wireless lock system. In one embodiment shown in FIG. 1A, the wireless lock system 20 includes a padlock 22 that is in communication with a control device 24, such a mobile phone or computer. The padlock 22 includes a housing 26 that contains the lock assembly and lock control assembly, as further described below. The padlock 22 also includes a hook member 28, which is preferably a U-shaped metal unit, and a motor driven pin 30. The shape of the hook member 28 may vary and is not limited to a U-shape. The hook member 28 is preferably non-moveably affixed to the housing. The motor driven pin 30 is configured to move vertically in and out of the housing 30. When the motor driven pin 30 is out of the housing 30, it abuts the end of the hook member 28 thereby forming a substantially closed loop. When the motor driven pin 30 is out of the housing 30, it is substantially adjacent to the end of the hook member 28 such that an object inside the closed loop, such as a post, could not pass through the space formed between the end of the hook member 28 and the motor driven pin 30. Thus, the padlock 22 is locked.

Figure 1B:
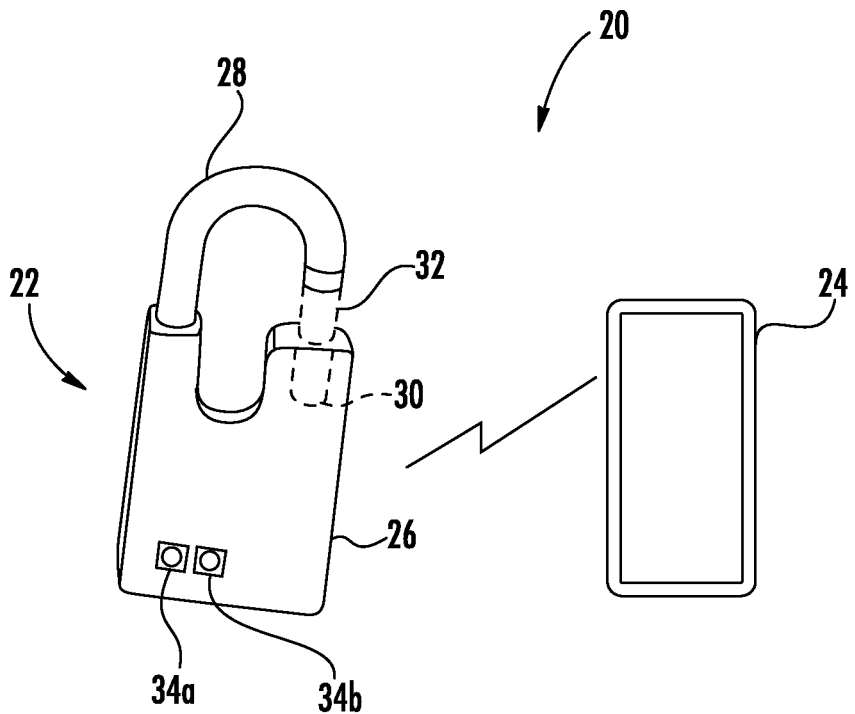
FIG. 1B shows the padlock of the wireless lock system in an unlocked position.

Referring to FIG. 1B, when the motor driven pin 30 moves vertically in the housing 26, it forms a gap 32 between the end of the hook member 28 and the housing 26. The closed loop becomes an open loop. An object inside hook member 28 can pass through the gap 32, and thus the padlock 22 is open and unlocked.

The wireless lock system includes a plurality of control buttons 34a and 34b. The control buttons 34a and 34b are connected to a controller, as further discussed below, to move the motor driven pin 30 vertically in and out of the housing 26 to unlock and lock the padlock 22, respectively. The control buttons 34a and 34b may be programmed such that it can operate the wireless lock system with a predetermined pattern in which they are pressed, either individually or in combination. For instance, they may be programmed to lock the padlock 22 by pressing control button 34a once then control button 34b once and finally control button 34a subsequently. They may be programmed to unlock the padlock 22 by pressing control button 34a twice then control button 34b three times. Or, control button 34a may be pressed four times to lock and unlock the padlock 22.

Figure 2:
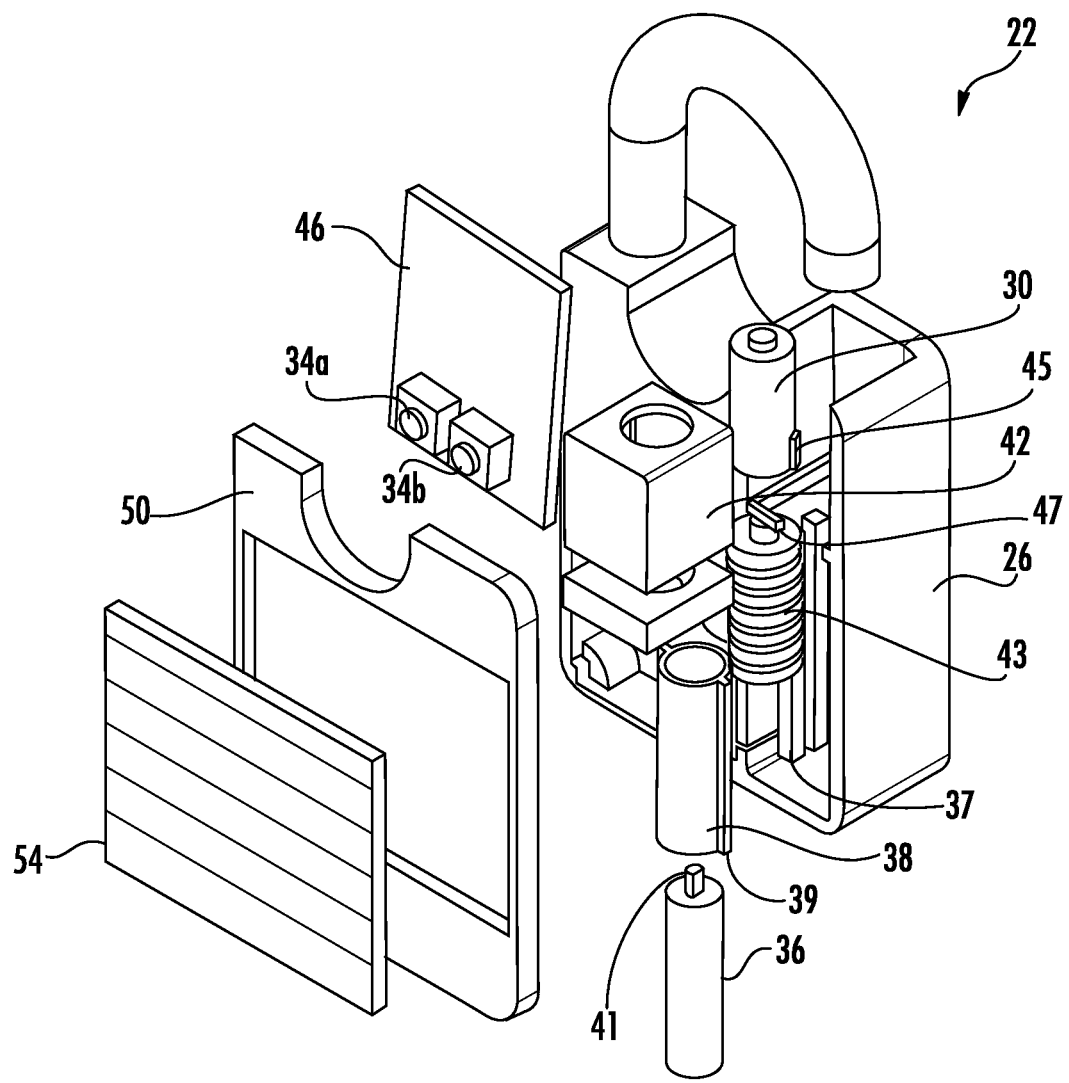
FIG. 2 is an exploded view of the padlock of FIGS. 1A and 1B.

Referring to FIG. 2, an exploded view of the padlock 22 is shown. A lock assembly is positioned inside the housing 26 and includes the motor driven pin 30 and a motor 36. The motor 36 is at the bottom of the housing 26 and is encased in a cylindrical motor sleeve 38 that has a pair of opposing elongated tabs 39. The housing includes a pair of opposing slots 37 that receives their respective tabs 39 inserted in them. The tip 41 of the motor 36 is attached to a mechanical gear 43, which is adapted to rotate within a nut 40 while the nut 40 is immovably affixed to the housing 26. Above the mechanical gear 43 and the nut 40 is a pin securing block 42 where the motor driven pin 30 is inserted. The motor driven pin 30 can slide up and down within the block 42. The bottom end of the motor driven pin 30 is attached to the top of the mechanical gear 43. The top end of the mechanical gear 43 has an attachment member 47 that fits into the notch 45 of the motor driven pin 30. When the motor 36 is activated, the motor 36 rotates the mechanical gear 43 either clockwise or counterclockwise, which either pushes the motor driven pin 30 in an upward motion or pulls the motor driven pin 30 in a downward motion. If the mechanical gear 43 pushes the motor driven pin 30 in an upward motion, the motor driven pin 30 comes out of the housing 26 towards the hook member 28 and forms a closed loop with the hook member 28 thereby locking the padlock 22. If the mechanical gear 43 pulls the motor driven pin 30 in a downward motion, the motor driven pin 30 moves towards the interior of the housing and creates a gap between the hook member 28 and the housing 26 thereby unlocking the padlock 22.

Figure 3:
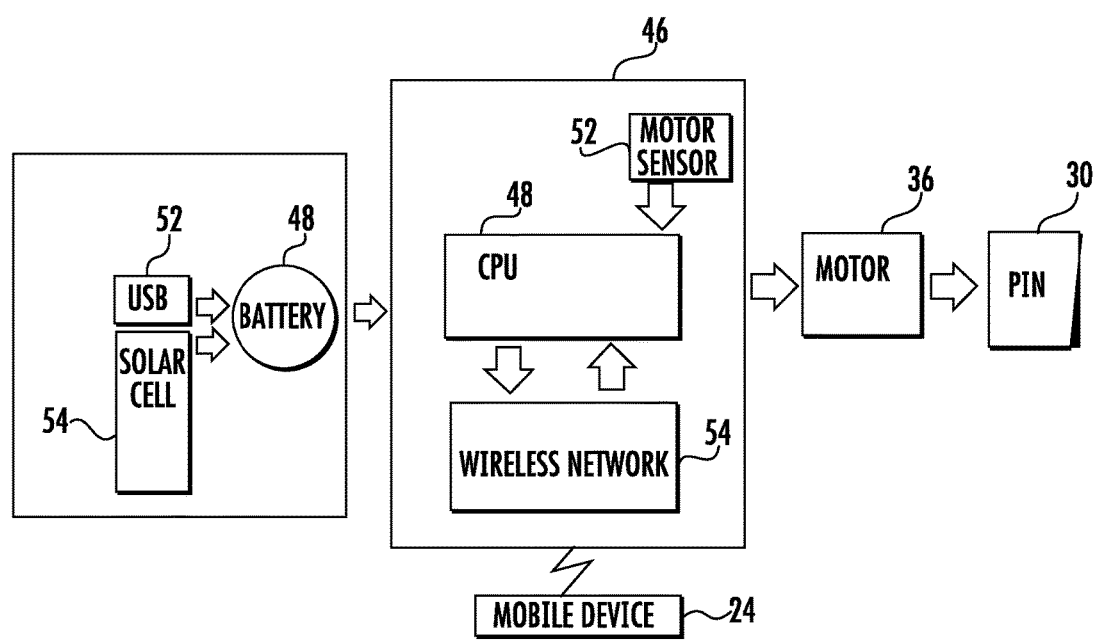
FIG. 3 is a schematic diagram of the electromechanical components of the wireless lock system.

A lock control assembly is also positioned inside the housing 26. The lock control assembly includes an electronic board 46 where the control buttons 34a and 34b are also mounted. The electronic board 46 preferably also includes a controller 48, a wireless network 50 and a motor sensor 52 (FIG. 3). The controller 48 is in communication with the motor 36. The wireless network 50 is preferably a Bluetooth wireless infrastructure. In other embodiments, it may be a Wi-Fi or other wireless network infrastructure known in the art. The motor sensor 52 preferably detects the position of the motor driven pin and transmits a signal to the controller to indicate the position of the motor driven pin, such as when it is inside the housing i.e. the padlock is unlocked, or protruding outside the housing i.e. the padlock is locked. The lock control assembly further includes a power source. The power source may be a battery 48 and/or a solar cell 54 (FIGS. 2 and 3). The battery 48 is preferably a chargeable battery, and may be charged either through a USB connection 52. A housing wall 50 secures all the components of the lock assembly and lock control assembly inside the housing 26.

FIG. 3 provides a schematic diagram of the electrical components of the wireless lock system 20. The wireless lock system 20 is powered by a battery 48, which may be charged using a USB connection 52 or a solar cell 54. The battery powers the lock control assembly components, which may be mounted to electronic board 46 and which may include a controller 48, a motor sensor 52, and a wireless network 50. The battery further powers the motor 36, which in turn, moves the mechanical gear 43 and the motor driven pin 30 to lock or unlock the padlock 22. A mobile device 24 may communicate with the controller 48 via the wireless network 50. The controller 48 is connected to the motor and is adapted to move the motor driven pin 30 to lock or unlock the padlock 22.

Figure 4:
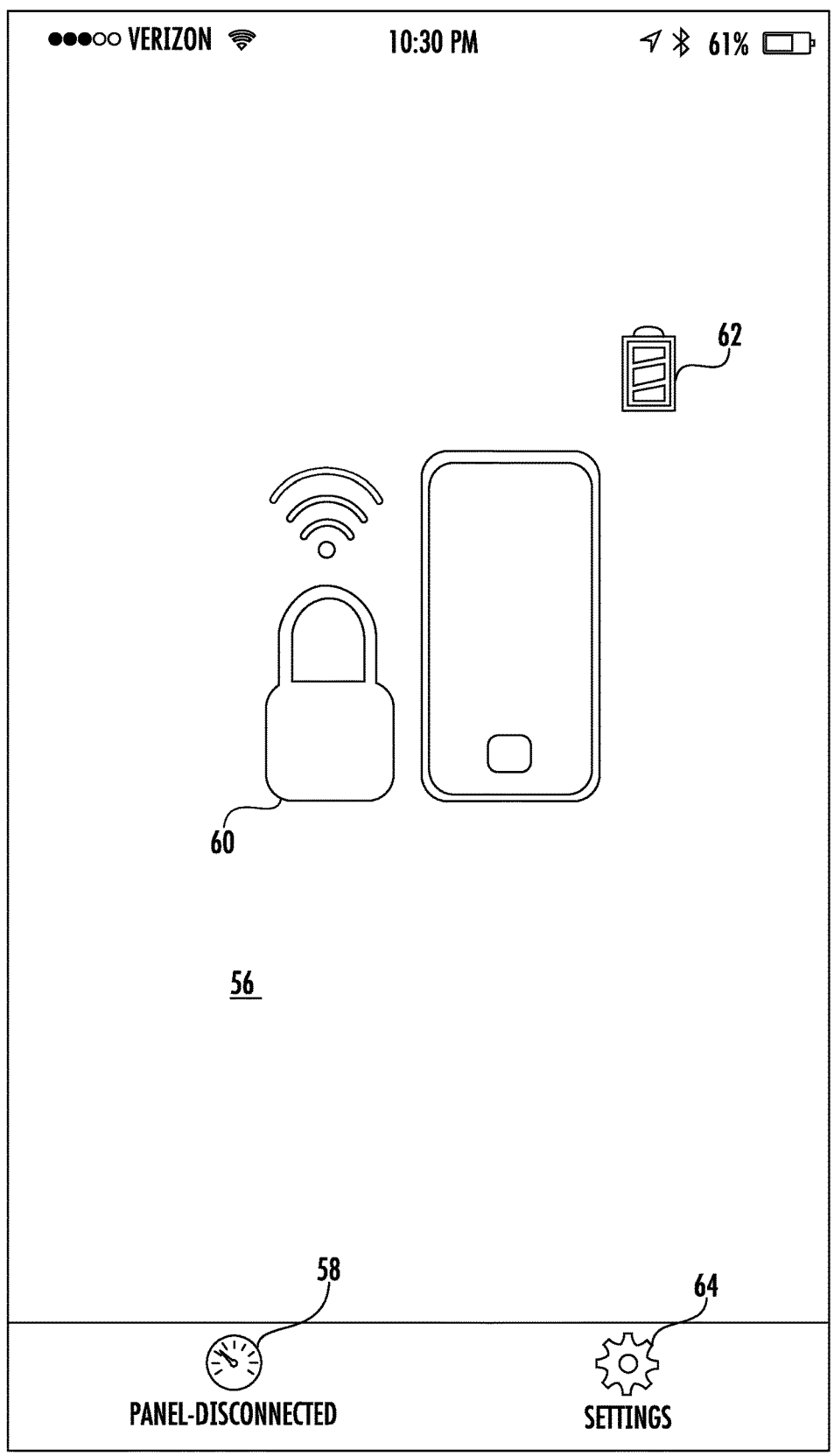
FIG. 4 is a screen shot of the mobile device running the mobile application of the present disclosure.
Figure 5:
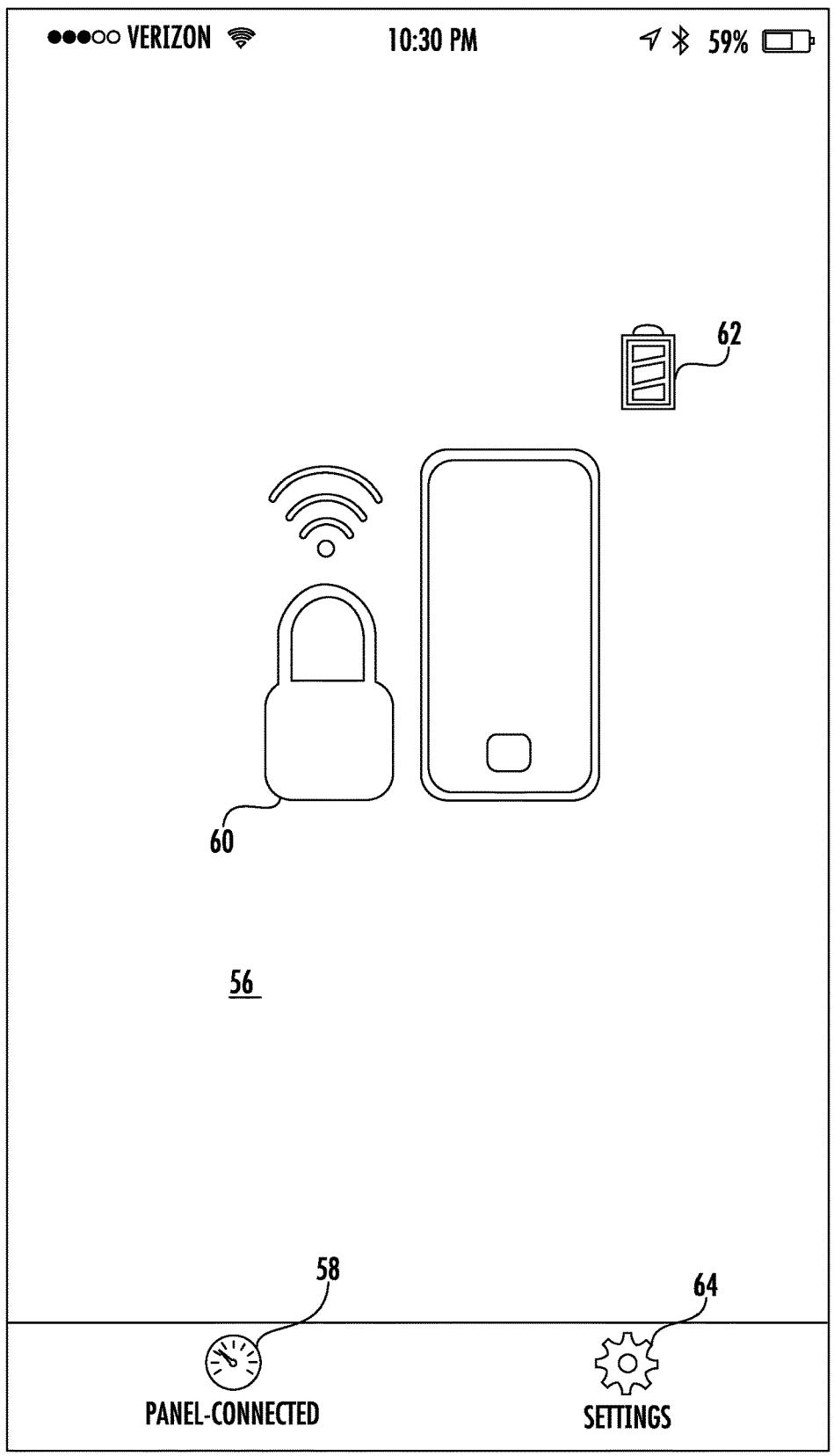
FIG. 5 is another screen shot of the mobile device of FIG. 4 showing the padlock being connected to the mobile device and locked.

The wireless lock system of the present disclosure includes a software or mobile application that would enable a user to control the padlock 22 via a mobile device. FIGS. 4-7 shows the screen shots of the mobile application. The mobile application provides a user interface displayed on the mobile device that includes an image of the padlock 60, a connection icon 58, and a padlock battery level indicator 62. In FIG. 4, the screen 56 of the mobile device informs the user whether the mobile device is connected to the wireless lock system with multiple indicia. First, a connection icon 58 is provided that states whether the wireless lock system is connected. If the wireless lock system is not connected, the connection icon 58 would display "PANEL-DISCONNECTED" (FIG. 4). If the wireless lock system is connected, the connection icon 58 would display "PANEL-CONNECTED" (FIG. 5). Second, an image 60 of the padlock would change colors. For instance, if the wireless lock system is not connected, the image 60 would be displayed in gray color. If the wireless lock system is connected, the image 60 would be displayed in green or red color. Image 60 would be green in color if the padlock is connected and locked. Image 60 would be red in color if the padlock is connected and unlocked. Image 60 would further change into an image of an unlocked padlock (FIG. 6) to indicate that the padlock is unlocked or to an image of a locked padlock (FIG. 5) to indicate that the padlock is locked. A user can touch the image 60 to lock or unlock the padlock, and the image 60 will inform the user whether the padlock is locked or unlocked by its color and representation. Once the user touches the image 60, the mobile device transmits a signal to the controller via the wireless network. The controller subsequently activates the motor to move the motor driven pin to lock or unlock the padlock depending on the user's instructions. The mobile application further provides a user interface displayed on the mobile device that includes a settings icon 64 to provide additional control to the user.

Figure 7:
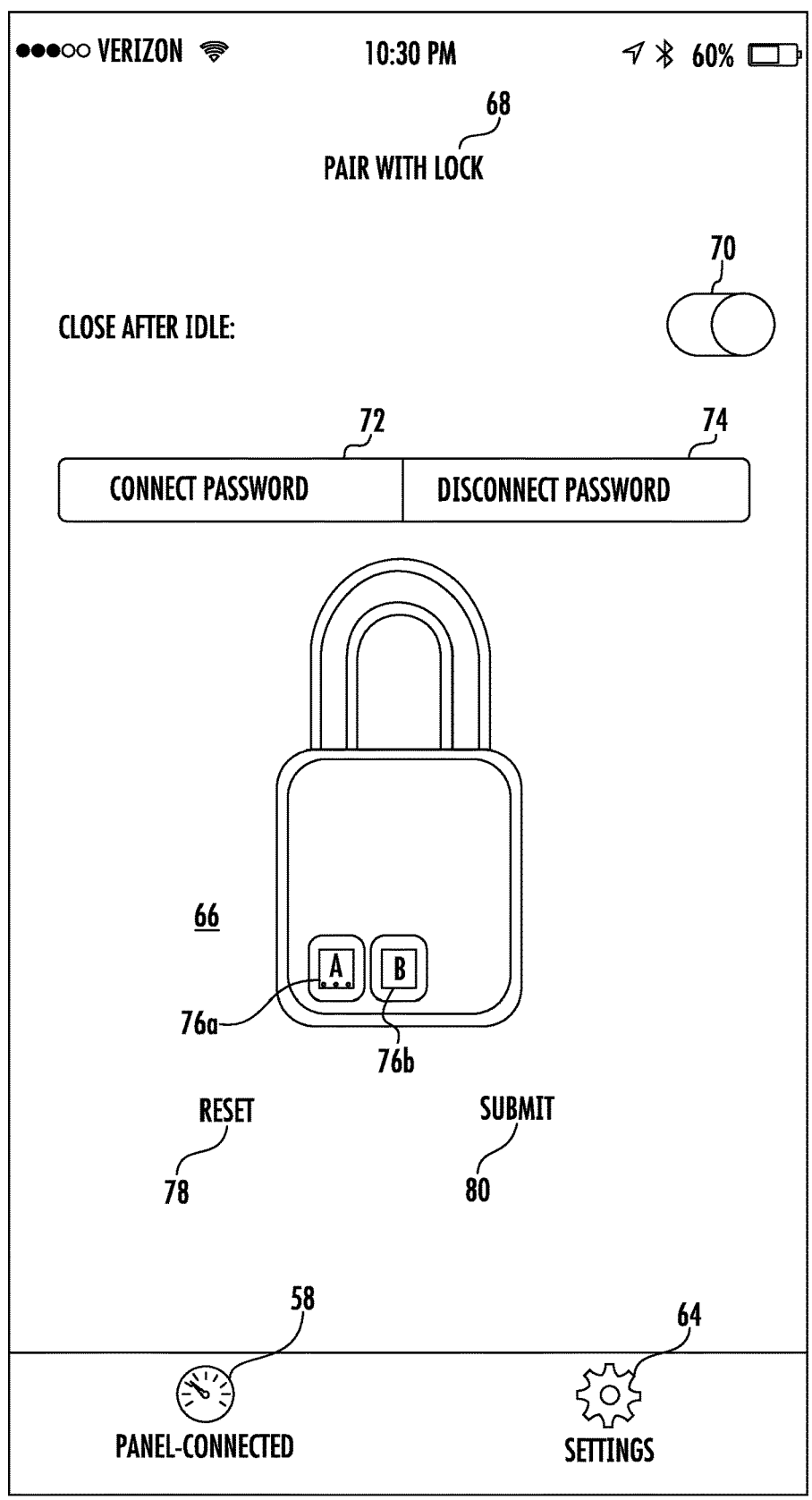
FIG. 7 is another screen shot of the mobile device of FIG. 4 showing the settings page.

Referring to FIG. 7, when the setting icon 64 is pressed, the settings screen 66 is shown. The settings screen 66 includes a pairing icon 68. If the pairing icon 68 is pressed, the Bluetooth wireless network connects the mobile device with the wireless lock system. The settings screen 66 also includes a "Close After Idle" button 70, wherein when activated, the mobile application closes after a predetermined amount of inactive time when the mobile application is not used, such as 1 minute. Next, the settings screen 66 includes password connection options, namely a "Connect Password" icon 72 and a "Disconnect Password" icon 74. If the user chooses to control the padlock using the control buttons 64a and 64b instead of the mobile device, the user can press on the "Disconnect Password" icon 74. The user can then set the password on the control buttons 64a and 64b. If the user chooses to control the padlock using the mobile device, the user can press the "Connect Password" icon 72. To set the password, the user presses the "Connect Password" icon 72. The user enters a sequence of button press between virtual buttons 76A and 76B then presses the "Submit" button 80. To reset the password, the user can press the "Reset" button 78.

Figure 6:
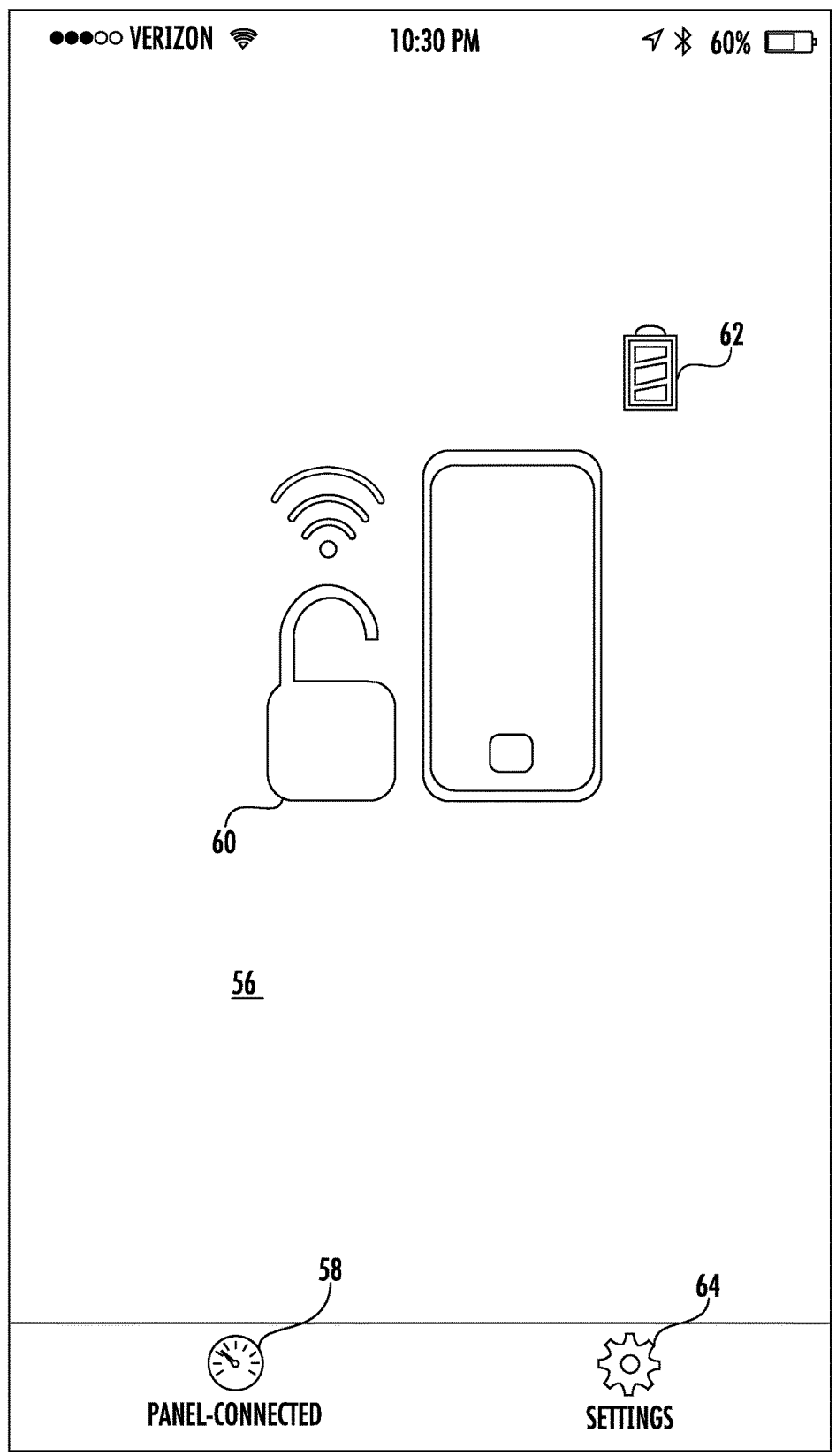
FIG. 6 is another screen shot of the mobile device of FIG. 4 showing the padlock being connected to the mobile device and unlocked.
Figure 8:
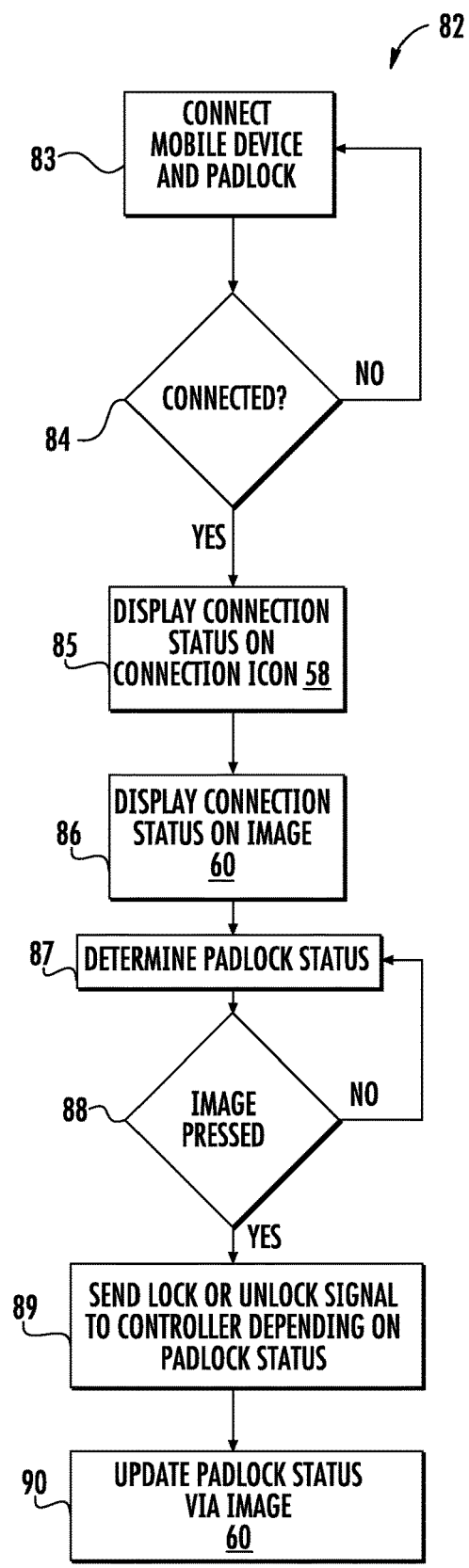
FIG. 8 shows a flowchart with the steps executed by the mobile application of the present disclosure.

FIG. 8 provides a flowchart 82 that is executed by the mobile application. At step 83, the application is configured to connect the mobile device to the padlock via the wireless network. This may be triggered when the user presses the "Pair With Lock" icon 68 on the settings screen 66 (FIG. 7). This may also be triggered when the Bluetooth of a previously paired device recognizes and pairs with the padlock. The application is configured to detect the connection at step 84. Once the connection is established, at step 85, the connection status is displayed on the connection icon 58. At step 86, the connection status is further displayed on the image 60 (FIGS. 4-6). At step 87, the application determines the padlock status i.e. whether the padlock is locked or unlocked. Next, at step 88, the application detects if the image 60 is pressed. Once the image 60 has been pressed, the application detects it and sends either a lock or unlock signal to the controller, depending on the prior status of the padlock (step 89). Finally, at step 90, the application updates the padlock status by changing the color and the appearance of the image 60.

Figure 9:
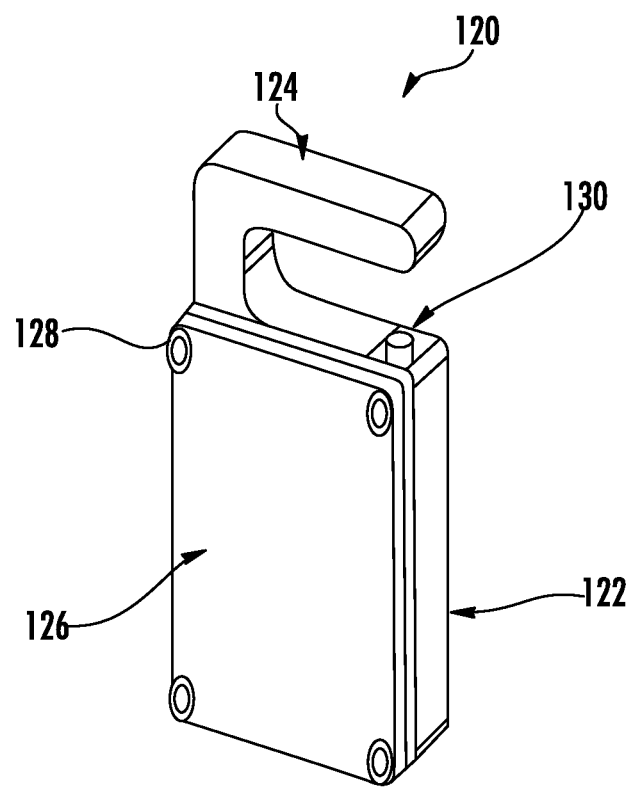
FIG. 9 is a perspective view of an embodiment of an electronic wireless remote controlled padlock of the present disclosure.

Another embodiment of the wireless lock system is shown in FIG. 9, which is in the form of an electronic wireless remote controlled padlock 120. Padlock 120 includes a housing 122 that houses its electrical components and lock components, including a motor driven pin 130 that is configured to move vertically relative to the body. The housing 122 includes a hook member 124 for receiving an object to be secured. When the pin 130 moves vertically to a locked position, the hook member 124 and the pin 130 creates a secured loop that allows the object to be secured. The housing 122 further includes a cover 126 that can be removed via fasteners 128 to provide access to the battery for battery replacement.

Figure 10:
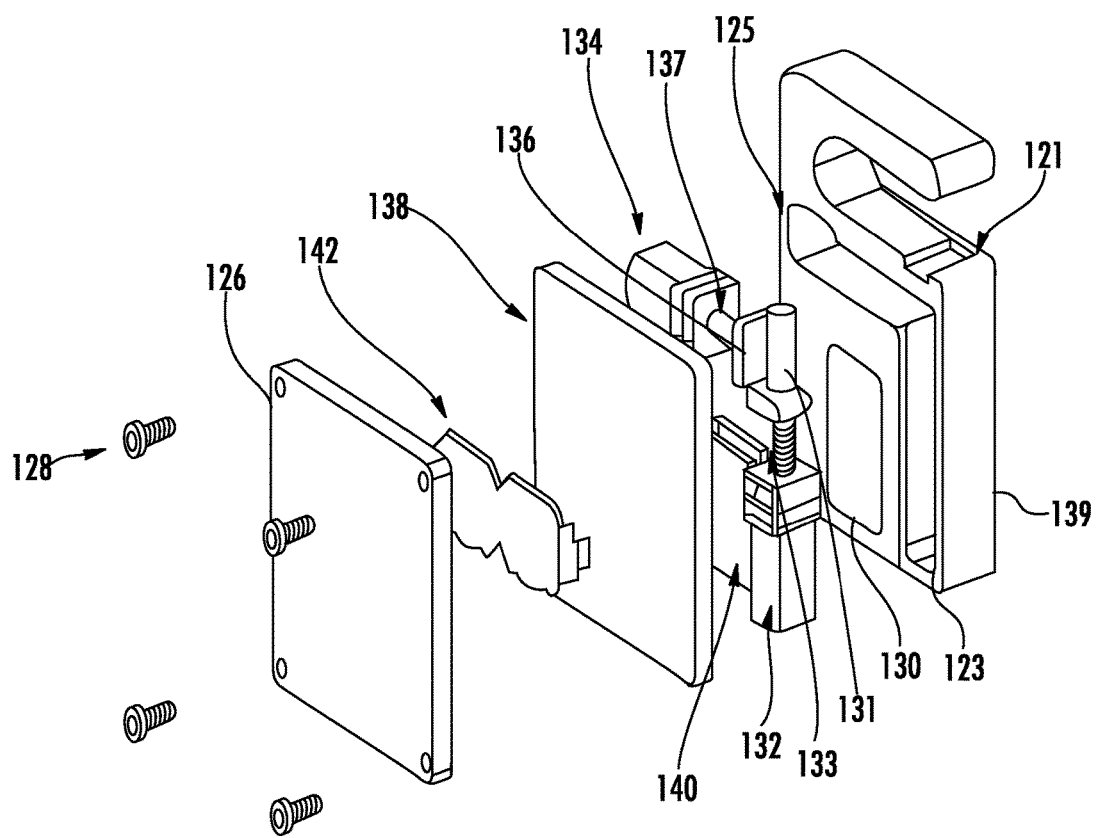
FIG. 10 is an exploded view of the padlock of FIG. 1.

Referring to FIG. 10, the interior side of the housing 122 defines several slots 121, 123, and 125 for storing electrical components and lock components of the padlock 120. The lock components include a first motor 132 that drives the motor driven pin 130. The motor driven pin 130 has a pin assembly that includes a pin driver 133 directly connected to the motor 132 and a stop 131 connected in between the pin 130 and the pin driver 133. Pin driver 133 moves the pin 130 vertically by adjusting its height. More specifically, the pin driver 133 rotates towards the motor 132 to reduce its height thereby moving the pin 130 downwards to an unlocked position. Pin driver 133 is further adapted to rotate away from the motor 132 to increase its height thereby moving the pin 130 upwards out of the housing 122 to a locked position. Pin 130 is positioned in slot 121 and moves in and out of the slot 121 of the body. First motor 132, pin driver 133, stop 131, and pin 130 are positioned in slot 123 which extends through slot 121.

Figure 11:
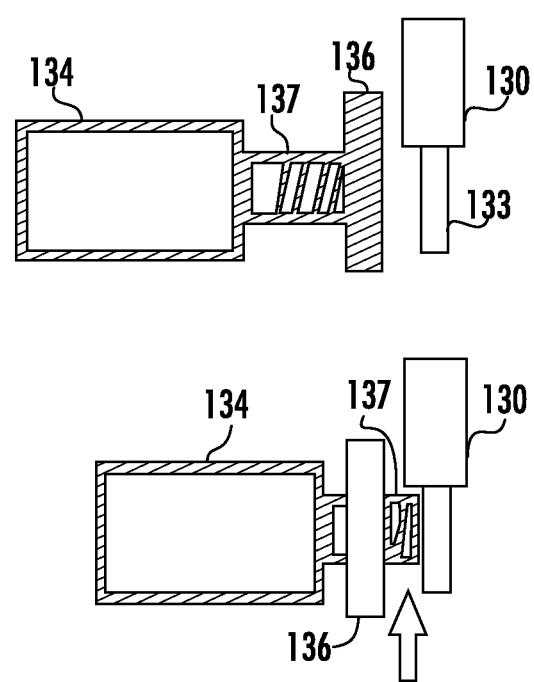
FIG. 11 is a schematic diagram showing the operation of the second motor and the second motor driver to further lock the pin of the padlock of FIG. 1.

Lock components further include a second motor 134 that drives a second motor driver 137 and a block 136. Second motor 134, second motor driver 137, and a block 136 are positioned in slot 125 of the housing 122. Second motor driver 137 moves perpendicular to the movement direction of the pin 130. When the pin 130 moves in a locked position partially outside slot 121, second motor 134 drives second motor driver 137 through the block 136 so that driver 137 goes under pin 130 and abuts pin 130 to maintain the pin 130 in a locked position (FIG. 11). Second motor driver 137 provides an added security feature by preventing manual manipulation of the pin 130, such as by manually rotating the pin 130 downwards using pliers to unlock the padlock 120.

Figure 12:
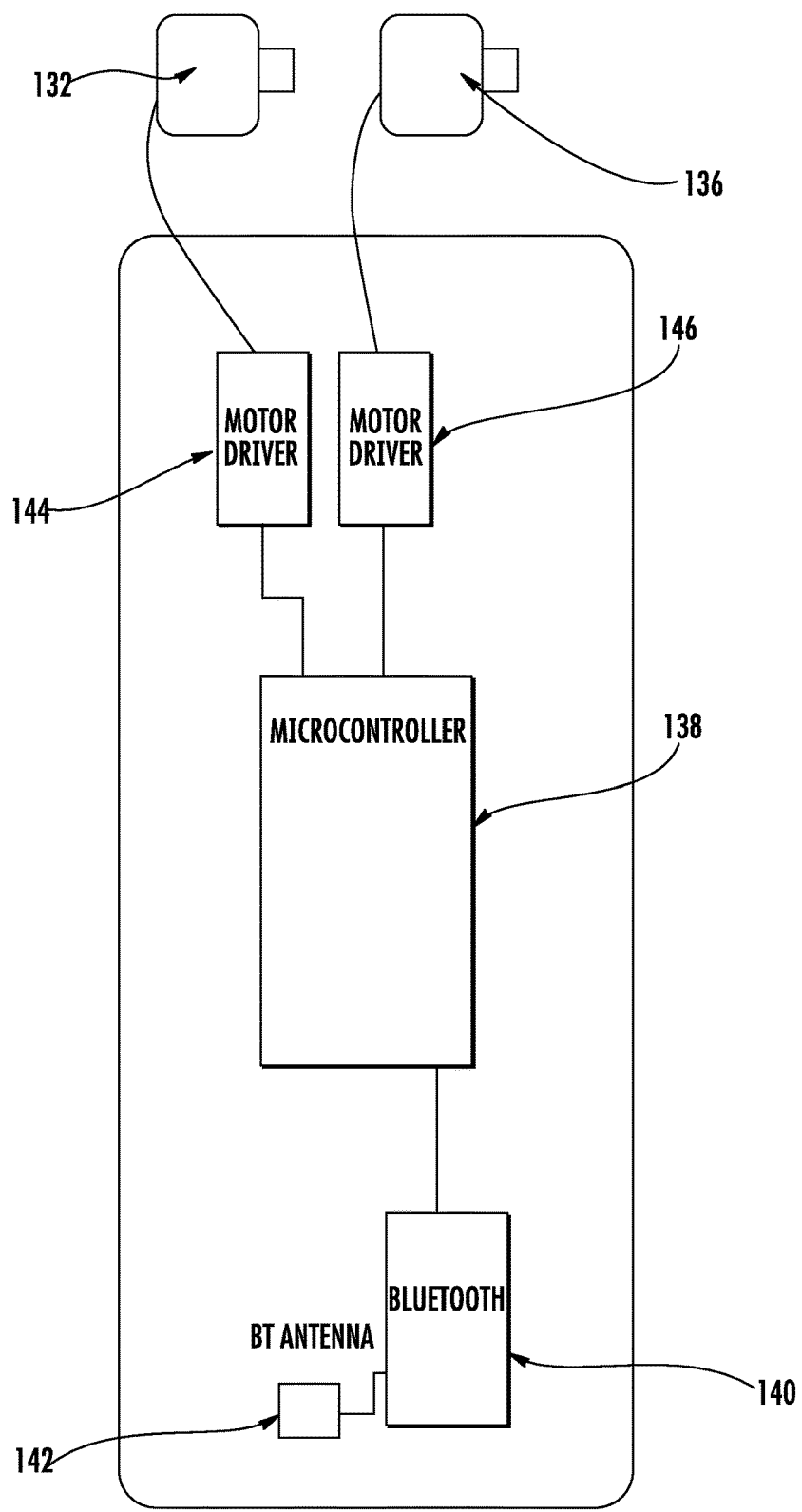
FIG. 12 is a schematic diagram showing the electronic components and the motor components of the padlock of FIG. 1.

Referring back to FIG. 12, electrical components of the padlock 120 include a Bluetooth controller 140 and antenna positioned in slot 139 and a controller 138, which positioned upright and covers slots 123, 125, and 139. Batteries are positioned next to and are connected to the controller 138. FIG. 12 shows a schematic diagram of the electrical components of the padlock 120 wherein the controller 138 is connected to the Bluetooth controller 140 and antenna 142. A pair of motor driver chips 144 and 146 are also provided and connected to the controller 138. Motor driver chip 144 communicates with first motor 132, and motor driver chip 146 communicates with second motor 136.

In use, padlock 120 is operated by a mobile device, such as a mobile phone or computer. A mobile application or software is programmed on the mobile device, which preferably provides a user interface to lock, unlock, and provide padlock status to the user. Mobile device communicates with the padlock 120 via the Bluetooth antenna 142 and controller 140. When a user wants to lock the padlock 120, the user can issue a lock command on the user interface of the mobile device. The mobile device transmits the lock command to the controller 138, which preferably sends a lock signal to the motor driver chip 144, which causes the first motor 132 to vertically move the pin 130 out of the slot 121 of the body towards the hook 124. The pin 130 and the hook 124 would form a secure, closed loop that is designed to secure an object that is inserted within the secure, closed loop. The controller would then send a lock signal to the motor driver chip 146 to activate the second motor 136 and move the second motor driver 137 towards the pin 130 and abut the pin 130. The controller 138 can be programmed to send signal to the motor driver chip 146 after a predetermined amount of time has passed after it has sent a signal to the motor driver chip 144. The controller 138 can further be programmed to send a signal to the Bluetooth controller 140 after a predetermined amount of time has passed after it has sent a signal to the motor driver chip 146 indicating that the padlock 120 is in the locked position.

When the user desires to unlock the padlock 120, the user can issue an unlock command on the user interface of the mobile device. The mobile device transmits the unlock command to the controller 138, which preferably sends an unlock signal to the motor driver chip 146, which causes the second motor 134 to move the second motor driver 137 away from the pin 130. The controller 138 would then send an unlock signal to the motor driver chip 144 to activate the first motor 132 to vertically move the pin 130 back into the slot 121 of the body away from the hook 124. The controller 138 can further be programmed to send a signal to the Bluetooth controller 140 after a predetermined amount of time has passed after it has sent a signal to the motor driver chip 144 indicating that the padlock 120 is in the unlocked position.

Figure 13A:
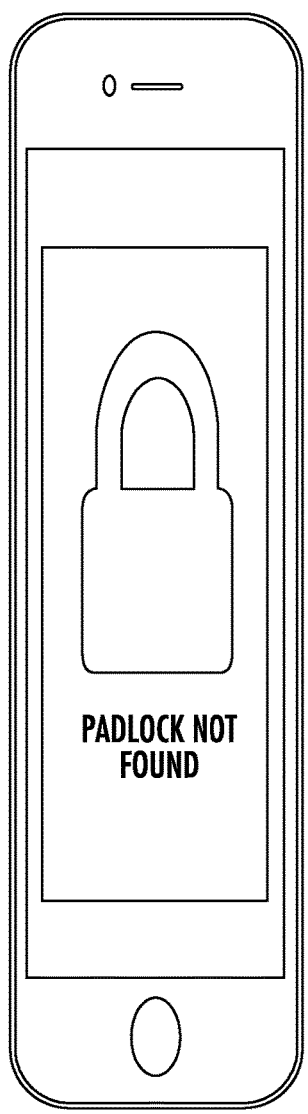
FIG. 13A is a screenshot of a mobile application of the present disclosure showing an indicia indicating that the padlock is not communicating with the mobile device.
Figure 13B:
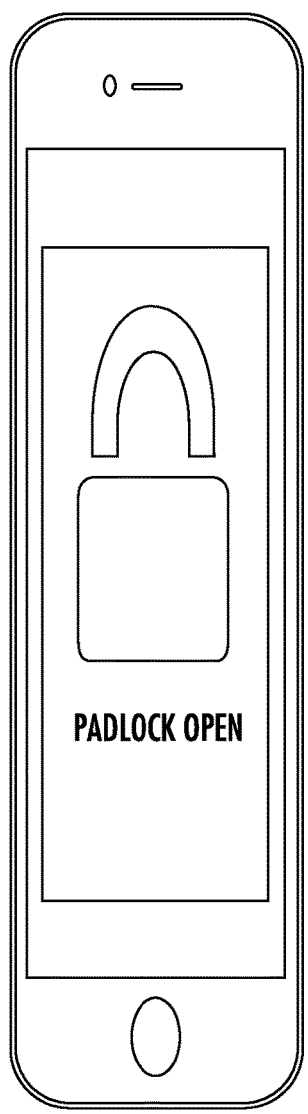
FIG. 13B is a screenshot of a mobile application of the present disclosure showing an indicia indicating that the padlock is communicating with the mobile device and is unlocked.
Figure 13C:
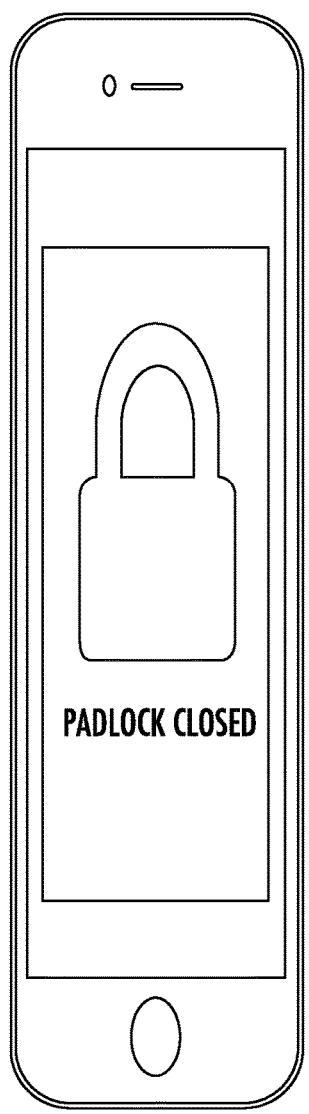
FIG. 13C is a screenshot of a mobile application of the present disclosure showing an indicia indicating that the padlock is communicating with the mobile device and is locked.

FIGS. 13A-13C shows an example user interface from a mobile application or software that can be displayed on the mobile device. FIG. 13A shows an indicia that is meant to notify the user that the mobile device is not communicating or connected with the padlock 120. FIG. 13B shows an indicia that is meant to notify the user that the padlock is connected with the mobile device and that the padlock is in the unlocked position. FIG. 13C shows an indicia that is meant to notify the user that the padlock is connected with the mobile device and that the padlock is in the locked position.

The present disclosure provides a padlock that is operated electronically and hands-free. The users do not have to manually open or close the padlock. This can provide much convenience. For instance, when students are carrying books to store in their lockers, the students do not have to manually dial a combination code. They do not have to free up a hand to unlock their padlocks. They can unlock their padlocks with a press of a button on their mobile phones, and they can open their lockers with ease. The present disclosure further provides a padlock that is wireless and can be operated remotely. The users can open their lockers or unlock their padlocks ahead of time so they can access their lockers or belongings with even more ease. They can lock them even when they are away from their lockers, which is beneficial when they forget to lock them. They can lock their padlocks as many times as they want from their mobile phones, and they can check their mobile phones to see if they have locked them. Of course, the present disclosure is not limited for use by students on their lockers. The padlock of the present disclosure can be used universally, such as by travelers, storage renters or owners, and anybody needing to secure their belongings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lock comprising: a motor driven pin; a first motor connected to the motor driven pin; a lock housing containing the first motor and the motor driven pin, the motor driven pin being moveable from an open position where it is inside the housing to a closed position where it is at least partially outside the housing; and a hook member having a first end and a second end, the hook member being connected to the housing via the first end, wherein when the motor driven pin is in the closed position, the hook member and the motor driven pin create a closed loop by the motor driven pin abutting the second end; wherein the hook member is non-moveably integral to the lock housing and the lock housing defines a passage for the motor driven pin to move vertically in and out of the lock housing to lock the system by being in the closed position, and to unlock the system by being in the open position.

2. The lock of claim 1 wherein the first motor moves the motor driven pin vertically in and out of the housing.

3. The lock of claim 1 further comprising: a controller positioned inside the body and in communication with the first motor; a Bluetooth controller in communication with the controller; a Bluetooth antenna in communication with the Bluetooth controller, wherein the lock can communicate with a mobile device via the Bluetooth antenna, Bluetooth controller, and the controller allowing the mobile device to control the first motor and a movement of the motor driven pin.

4. The lock of claim 1, wherein the motor driven pin moves in a first direction, the lock further comprising: a second motor driver adapted to move in a second direction perpendicular to the first direction of the motor driven pin; a second motor connected to the second motor driver, the second motor driver and the second motor being contained in the housing; wherein movement of the second motor driver after movement of the motor driven pin into the closed position causes the second motor driver to be underneath the motor driven pin and abut the pin, causing the motor driven pin to be maintained by the second motor driver in the closed position.

5. The lock of claim 1 further comprising a programmable control button connected with the controller, the control button being configured to cause the motor driven pin to move between the open position and the closed position via the first motor that is in communication with the controller.

6. A wireless lock system comprising: a motor driven pin; a motor connected to the motor driven pin; a controller in communication with the motor; a wireless-communication network in communication with the controller, the wireless-communication network allowing a mobile device to communicate with the controller to operate the motor and the motor driven pin; a lock housing containing the motor and the motor driven pin, the motor driven pin being moveable from an open position where it is inside the housing to a closed position where it is at least partially outside the housing; and a hook member having a first end and a second end, the hook member being connected to the lock housing via the first end, wherein when the motor driven pin is in the closed position, the hook member and the motor driven pin create a closed loop by the motor driven pin abutting the second end; wherein the hook member is non-moveably integral to the lock housing and the lock housing defines a passage for the motor driven pin to move vertically in and out of the lock housing to lock the system by being in the closed position, and to unlock the system by being in the open position.

7. The wireless lock system of claim 6 wherein the wireless-communication network is Bluetooth.

8. The wireless lock system of claim 6 further comprising a programmable control button connected with the controller, the control button being configured to cause the motor driven pin to move between the open position and the closed position.

9. The wireless lock system of claim 6 wherein the lock housing defines a passage for the motor driven pin to move vertically in and out of the lock housing to lock and unlock the system.

10. The wireless lock system of claim 6 further comprising a mobile device having a set of programmed instructions to transmit a signal to the controller via the wireless communication network to move the motor driven pin between the open position and the closed position.

11. The wireless lock system of claim 10 wherein the mobile device includes a display interface to lock and unlock the system.

12. The wireless lock system of claim 10 wherein the mobile device includes a display interface to set a password to access the system.

13. The wireless lock system of claim 10 wherein the mobile device includes a display interface that shows whether the wireless lock system is connected with the mobile device.

14. A wireless lock system comprising: a padlock having a housing and a hook member having a first end and a second end, the hook member being connected to the housing via the first end; a pin positioned within the housing and adapted to move vertically from an open position where a majority of the pin is inside the housing to a closed position where a majority of the pin is outside the housing, wherein when the pin is in the closed position, the pin forms a substantially closed loop with the hook member by abutting the second end; wherein the hook member is non-moveably integral to the lock housing and the lock housing defines a passage for the motor driven pin to move vertically in and out of the lock housing to lock the system by being in the closed position, and to unlock the system by being in the open position; a motor connected to the pin; a controller connected to the motor; a wireless communication network connected to the controller; and a mobile device connectable to the wireless communication network, the mobile device including a display interface that displays whether the pin is in the open position or the closed position, the mobile device being further configured to send a signal to the controller to move the pin between the open position and the closed position.

15. The wireless lock system of claim 14 wherein the wireless communication network is Bluetooth.

16. The wireless lock system of claim 14 further comprising a programmable control button affixed to the padlock and connected with the controller, the control button being configured to cause the pin to move between the open position and the closed position.

17. The wireless lock system of claim 14 wherein the display interface of the mobile device displays an option to use the programmable control button to control the pin or the mobile device.

18. The wireless lock system of claim 14 further comprising a second motor driver adapted to move perpendicular to movement direction of the motor driven pin; and a second motor connected to the second motor driver, the second motor driver and the second motor being contained in the housing.

19. The wireless lock system of claim 14 wherein the display interface of the mobile device displays an icon symbolizing the status of the padlock, the icon displaying a first color when the pin is in the open position and a second color when the pin is in the closed position.

20. The wireless lock system of claim 14 wherein the display interface of the mobile device displays a connection icon to indicate whether the mobile device is in communication with the controller.

* * * * *